(12) United States Patent
May et al.

(10) Patent No.: US 11,157,141 B2
(45) Date of Patent: *Oct. 26, 2021

(54) ELECTRONIC DEVICE AND METHOD OF MESSAGING MEETING INVITEES (71) Applicant: BLACKBERRY LIMITED, Waterloo (CA)

(72) Inventors: Darrell Reginald May, Waterloo (CA); Atif Khan, Waterloo (CA); Andrew Douglas Bocking, Los Altos, CA (US)

(73) Assignee: BlackBerry Limited, Waterloo (CA)

( * ) Notice: Subject to any disclaimer, the term of this patent is extended or adjusted under 35 U.S.C. 154(b) by 94 days.

This patent is subject to a terminal disclaimer.

(21) Appl. No.: 16/050,402

(22) Filed: Jul. 31, 2018

(65) Prior Publication Data
US 2019/0138167 A1 May 9, 2019

Related U.S. Application Data (63) Continuation of application No. 15/349,417, filed on Nov. 11, 2016, now Pat. No. 10,037,126, which is a (Continued)

(51) Int. Cl.
*G06F 3/0482* (2013.01)
*G06Q 10/10* (2012.01)
(Continued)

(52) U.S. Cl.
CPC ........ *G06F 3/0482* (2013.01); *G06F 3/04842* (2013.01); *G06Q 10/109* (2013.01);
(Continued)

(58) Field of Classification Search
CPC .. G06Q 10/109; G06Q 10/1095; G06F 3/048; H04M 1/72436
See application file for complete search history.

(56) References Cited

U.S. PATENT DOCUMENTS 6,604,079 B1 * 8/2003 Ruvolo ................ G06Q 10/107
705/7.15
7,519,924 B2 * 4/2009 Booking .............. G06Q 10/109
705/7.19
(Continued)

FOREIGN PATENT DOCUMENTS

EP 1655693 A1 5/2006

OTHER PUBLICATIONS

Boyce, Jim ( Microsoft Office Outlook ) 2003.*
(Continued)

*Primary Examiner* — Cao H Nguyen
(74) *Attorney, Agent, or Firm* — Fish & Richardson P.C.

(57) ABSTRACT

A method of composing an email message at an electronic device and an electronic device operable to carry out the method are provided. The method includes receiving an email command from a user input of the electronic device through a calendar user interface, the email command relating to at least one of a plurality of intended attendees of a calendared meeting, and providing an email composition interface in response to receiving the email command. The email composition interface includes a user-editable portion of an address field. The user-editable portion of the address field is automatically populated with email address information for the at least one of the plurality of intended attendees.

20 Claims, 8 Drawing Sheets

Related U.S. Application Data continuation of application No. 14/923,583, filed on Oct. 27, 2015, now Pat. No. 9,495,086, which is a continuation of application No. 12/772,623, filed on May 3, 2010, now Pat. No. 9,177,300, which is a continuation of application No. 11/495,775, filed on Jul. 31, 2006, now Pat. No. 7,730,404.

(51) Int. Cl.
*H04M 1/72436* (2021.01)
*G06F 3/0484* (2013.01)
*H04L 12/58* (2006.01)
*H04M 1/72451* (2021.01)

(52) U.S. Cl.
CPC ........ *H04L 51/28* (2013.01); *H04M 1/72436* (2021.01); *H04M 1/72451* (2021.01)

(56) References Cited

U.S. PATENT DOCUMENTS

2004/0088362 A1\* 5/2004 Curbow ............... G06Q 10/109
709/207
2004/0143472 A1\* 7/2004 Estrada ............ G06Q 10/06313
705/7.23

OTHER PUBLICATIONS

May, Darrell Reginald, et al. "Electronic Device and Method of Messaging Meeting Invitees", U.S. Appl. No. 12f772623, filed May 3, 2010. Now U.S. Pat. No. 9,177,300, issued Nov. 3, 2015.
EPO, Summons to attend oral proceedings pursuant to Rule 115(1) EPC, Feb. 13, 2019, re European Patent Application No. 06118173.1.

\* cited by examiner

| Calendar | |
|---|---|
| 8:00 | |
| 9:00 | |
| 10:00 a.m. Departmental Meeting 🔔 | |
| 11:00 | |
| 12:00 | |
| 1:00 p.m. Dentist Appointment 🔔 | |
| 2:00 | |
| 3:00 | |
| 4:00 | |
| 5:00 | |

FIG. 4

| Calendar | |
|---|---|
| 8:00 | Go To Date... |
| | Prev. Day |
| 9:00 | Next Day |
| | Prev. Week |
| 10:00 a.m. Departm | Next Week |
| 11:00 | New |
| | Open |
| 12:00 | Delete |
| 1:00 p.m. Dentist | View week |
| 2:00 | View Month |
| | Close |
| 3:00 | |
| 4:00 | |
| 5:00 | |

FIG. 5

| Appointment |
|---|
| Subject: Departmental Meeting<br>Location: Board Room 1 |
| ☐ All Day Event<br>Start: Tue. Nov. 2, 2006  10:00 AM<br>End:   Tue. Nov. 2, 2006  11:00 AM<br>Duration:              1 Hour 0 Mins<br>Time Zone:                  EST (-5)<br>Reminder:                   15 Mins<br>Invited:<br>Peter Smith <p.smith@pp1.com><br>Sandra Jones <s.jones@pp1.coom><br>Bill Johnson <b.johnson@pp1.com> |
| Notes: |

FIG. 6

| Appoint| Email Invitee |
|---|---|
| | Email All |
| Subject: | Add Invitee as Contact |
| Location: | Close |

☐ All Day
Start: Tue
End: Tue. Nov. 2, 2006 11:00 AM
Duration: 1 Hour 0 Mins
Time Zone: EST (-5)
Reminder: 15 Mins
Invited:
Peter Smith <p.smith@pp1.com>
Sandra Jones <s.jones@pp1.coom>
Bill Johnson <b.johnson@pp1.com>
Notes:

FIG. 7

To: Sandra Jones<s.jones@pp1.com>
Cc:
Subject: Departmental Meeting

FIG. 8

```
To: Peter Smith<p.smith@pp1.com>
To: Sandra Jones<s.jones@pp1.com>
To: Bill Johnson<b.johnson@pp1.com>
Cc:
Subject: Departmental Meeting
```

FIG. 9

| New Address |
|---|
| Title: |
| First Name: Sandra |
| Last Name: Jones |
| Email: s.jones@pp1.com |
| Company: |
| Job Title: |
| Work Phone: |
| Home Phone: |
| Mobile Phone: |
| Address: |
| Notes: |

| Appointi | Email Invitee |
|---|---|
| | Email All |
| Subject: | View Contact |
| Location: | Close |
| ☐ All Day | |
| Start: Tu| |
| End: Tue. Nov. 2, 2006 11:00 AM |
| Duration: 1 Hour 0 Mins |
| Time Zone: EST (-5) |
| Reminder: 15 Mins |
| Invited: |
| Peter Smith <p.smith@pp1.com> |
| Sandra Jones <s.jones@pp1.coom> |
| Bill Johnson <b.johnson@pp1.com> |
| Notes: |

FIG. 12

ELECTRONIC DEVICE AND METHOD OF MESSAGING MEETING INVITEES

CROSS-REFERENCE TO RELATED APPLICATION

This is a continuation of U.S. patent application Ser. No. 15/349,417, filed Nov. 11, 2016 now patent Ser. No. 10/037,126 issued Jul. 31, 2018, which is a continuation of U.S. patent application Ser. No. 14/923,583, filed Oct. 27, 2015, now U.S. Pat. No. 9,495,086 issued on Nov. 15, 2016, which is a continuation of U.S. patent application Ser. No. 12/772,623, filed on May 3, 2010 now U.S. Pat. No. 9,177,300 issued on Nov. 3, 2015, which is a continuation of U.S. patent application Ser. No. 11/495,775 filed on Jul. 31, 2006, U.S. Pat. No. 7,730,404 issued on Jun. 1, 2018. The entire contents of each of the above-identified prior applications are hereby incorporated by reference

FIELD

The present application relates to electronic devices with calendar and messaging applications for appointments and meetings.

BACKGROUND

Electronic devices and can provide a variety of functions including calendar and meeting-related functions as well as electronic messaging. Electronic devices can include several types of devices including desktop computers or mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Many portable electronic devices include a variety of applications for performing calendar and meeting-related functions, email functions, telephone functions, short message service (SMS) functions, Web browser functions and address book functions. Calendar applications allow users to track and manage appointments and meetings and to set reminders for such appointments and meetings. The information relating to meetings, for example, including the time, place and invitees, is commonly included in a calendared meeting event saved using the calendar application on an electronic device. This information is saved and may be selectively manipulated and displayed to the user in various formats to view monthly, weekly or daily calendared events.

Many calendar applications permit users to invite individuals to meetings and to be invited by other individuals to meetings by sending and receiving invitations by electronic mail. The invitees are specified by the sender of the invitation, through the calendar application. In some portable electronic devices, such invitations can be prepared and sent from the portable electronic device or received at the portable electronic device via wireless communication. A subroutine of the calendar application typically permits the user of the electronic device to accept or reject a meeting invitation from a user of another electronic device. Meetings for which an invitation is accepted at an electronic device, are automatically saved as calendared events to the calendar application of that electronic device. Similarly, meetings for which invitations are sent from an electronic device are also automatically saved as calendared events to the calendar application of that electronic device.

In preparation for scheduled meetings, it is common for users of an electronic device to send information to one or more of the attendees of the meeting. For example, one of the attendees may wish to circulate a message, an agenda, an update or brief prior to or following the meeting. Such messages can be sent electronically via email. To send the messages, the user of an electronic device creates a new email message using an email message application and the user must address the message to each meeting attendee or each intended recipient. This can be cumbersome especially in cases where an intended recipient is not included in the user's electronic address book. In such a case, the user can manually enter the intended recipient's email address in the appropriate user-editable portion of an address field of the email. In addition to being cumbersome, the manual entry of email addresses often leads to errors in addressing causing delivery failure of the email.

Improvements in messaging meeting attendees are therefore desirable.

BRIEF DESCRIPTION OF THE DRAWINGS

The electronic device and method of composing an email message will be better understood with reference to the following description and to the Figures, in which.

DETAILED DESCRIPTION OF THE EMBODIMENTS

Figure 1:
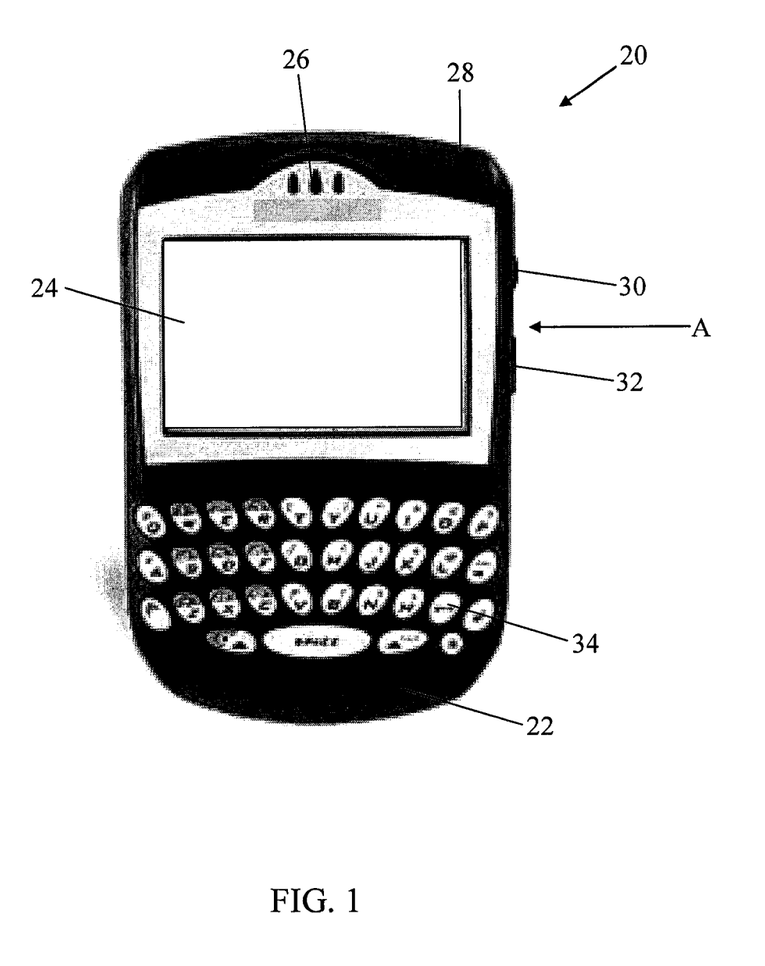
FIG. 1 is a representation of an electronic device for modifying a user profile in accordance with one embodiment.

Referring to FIG. 1, an electronic device for composing an email message in accordance with an embodiment is indicated generally by the numeral 20. In the present embodiment, the electronic device 20 is based on the computing environment and functionality of a wireless personal digital assistant. It will be understood, however, that the electronic device 20 is not limited to a wireless personal digital assistant. Other electronic devices are possible, such as desktop computers, cellular telephones, smart telephones, and laptop computers. Referring again to the present embodiment, the electronic device 20 includes a housing 22 that frames an LCD display 24, a speaker 26, and LED indicator 28, a trackwheel 30, an exit key 32 and a key pad 34. The trackwheel 30 and the exit key 32 can be inwardly depressed along the path of arrow A as a means to provide additional user input. The housing 22 is made from a suitable material as will occur to those skilled in the art, and can be stored, for example, in a holster (not shown) that includes an attachment for attaching to a user's belt.

Figure 2:
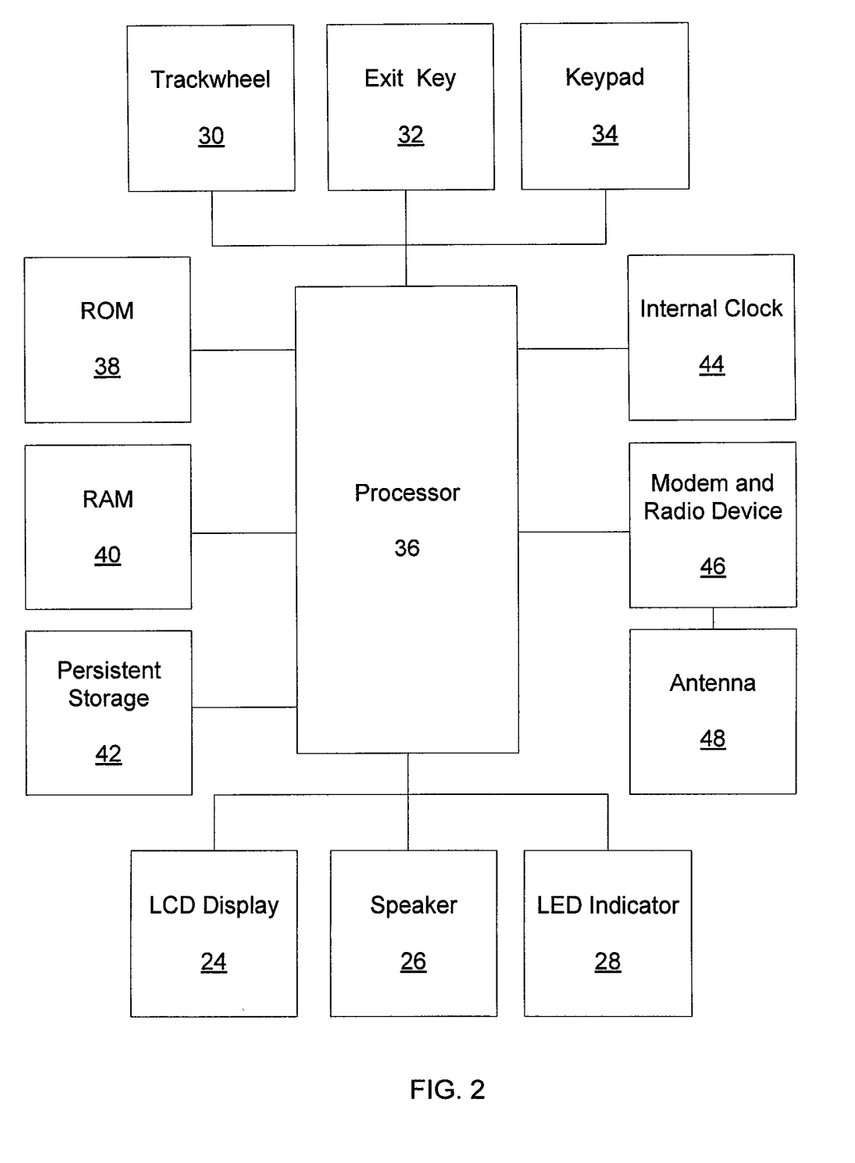
FIG. 2 is a block diagram of certain internal components within the electronic device of FIG. 1.

Referring now to FIG. 2, a block diagram of certain internal components within the electronic device 20 is shown. The electronic device 20 is based on a microcomputer that includes a processor 36 that is connected to a read-only memory (ROM) 38 that contains a plurality of applications executable by the processor 36 that enables the device 20 to perform certain functions. The processor 36 is also connected to a random access memory unit (RAM) 40 and a persistent storage device 42 which are responsible for various non-volatile storage functions of the device 20. The processor 36 receives input from various input devices including the trackwheel 30, the exit key 32, and the keypad 34. The processor 36 outputs to various output devices including the LCD display 24, the speaker 26 and the LED indicator 28. The processor 36 is also connected to an internal clock 44 and a modem and radio device 46. The modem and radio device 46 is used to connect to various wireless networks using an antenna 48.

Figure 3:
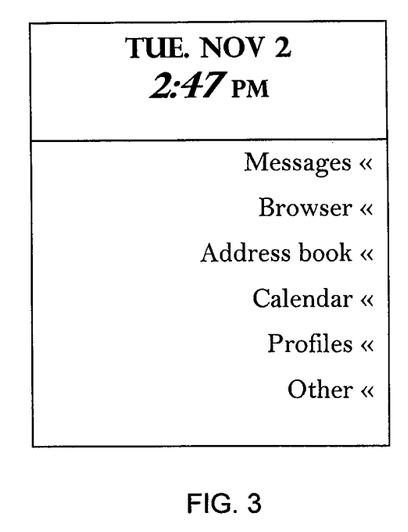
FIGS. 3 to 10 show exemplary screens of an LCD display of the electronic device of FIG. 1.

Reference is now made to FIG. 3 which shows an exemplary menu screen that is displayed on the LCD display 24 of the electronic device 20. (The remainder of the electronic device 20 is not shown in FIG. 3.) The exemplary menu screen includes a display clock that is updated according to the internal clock 44. The electronic device 20 is operable to execute various applications stored in the ROM 38. Such applications include, for example, Messages, a Web browser, an Address book, a Calendar, Profiles, and others. When executed by the processor 36, each application causes the device to operate in certain ways. The trackwheel 30 is used for scrolling through the applications and for selecting a desired application by pressing inwardly, along the path of arrow A, on the trackwheel 30. The exit key 32 is used for exiting any application by pressing inwardly along the path of arrow A.

It will be appreciated that emails are received on the electronic device 20 through a network (not shown), that wirelessly connects to the electronic device 20 via the modem and radio device 46 through the antenna 48. Each email that is received includes a variety of information including a date of receipt, time of receipt and sender email information. In order to compose or view an email message, the Messages application is selected by scrolling using the trackwheel 30 and pressing inwardly, which causes the execution of the Messages application by the processor 36.

It will also be appreciated that the Calendar application is used for displaying and storing calendared events such as appointments, lectures, exams, movies, meetings, performances, dinners, ceremonies, etc., when executed by the processor 36. Each calendared event includes a variety of information including a date and time of the event.

The Address Book application provides a user interface for creating, viewing and managing address book data including contacts names, addresses, email addresses, telephone numbers, and other information when executed by the processor 36.

The Profiles application on the LCD display 24 is used for selection and customization of notification modes. Selection of the Profiles application on the LCD display 24 causes the processor 36 to execute the Profiles application and display a Profiles screen on the LCD display 24, including a number of profiles for selection. For example, the profiles screen can include profiles such as Loud, Vibrate, Quiet and Default profiles, all of which are selectable for controlling the mode of notification upon the occurrence of an event. Each profile can be customized to give rise to different notification output for various applications on the electronic device.

Figure 4:
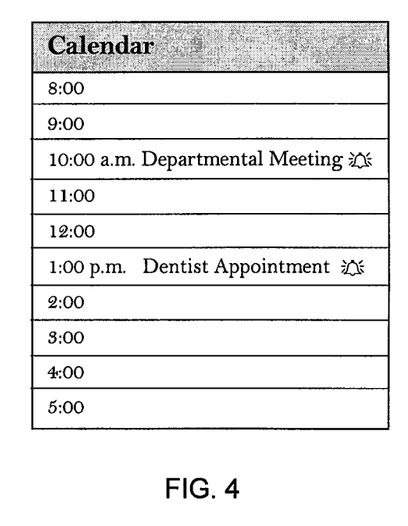

Selection of the Calendar application on the LCD display 24 causes the processor 36 to execute the Calendar application, providing a calendar user interface and displaying information relating to calendared events including meetings saved using the calendar application. This information can be selectively manipulated by and displayed to the user in various formats including monthly, weekly or daily schedules. In the exemplary display screen shown in FIG. 4, a daily schedule format is shown. In FIG. 4, two appointments in the form of calendared events are shown, including a "Departmental Meeting" from 10:00 a.m. to 11:00 a.m. and a "Dentist Appointment", from 1:00 p.m. to 2:00 p.m.

Figure 5:
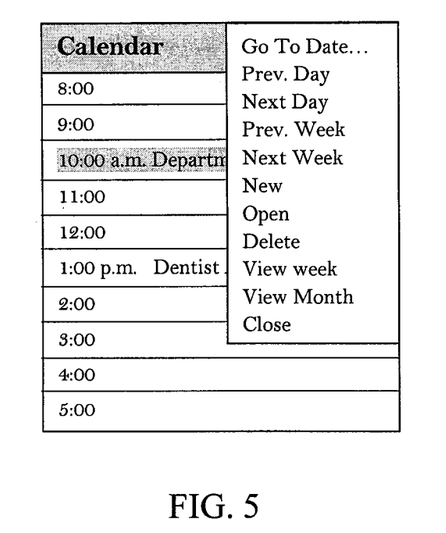

Upon selection of either one of the two calendared events, a submenu is displayed on the LCD display 24, displaying different options for user selection, including, for example, Go To Date, Prev Day, Next Day, Prev Week, Next Week, New, Open, Delete, View Week, View Month, and Close, as shown in FIG. 5. Selection of the Go To Date option provides a user-editable date field for the user to specify a date for displaying on the LCD display 24. Selection of the Prev Day option results in the display of the schedule for the day prior to that displayed in FIG. 4. Similarly, selection of the Next Day option results in the display of the schedule for the day following that displayed in FIG. 4. Selection of the Prev Week option results in the display of the schedule for the week prior to the day displayed in FIG. 4. Selection of the Next Week option results in the display of the schedule for the week following the day displayed in FIG. 4. Selection of the New option provides a graphical user interface for composition of a new event for addition to the calendar display. Selection of the Open option results in the display of details of the selected calendared event on the LCD display 24. Selection of the Delete option deletes the selected calendared event. Selection of the View Week option results in the display of the weekly schedule for the week including the day displayed in FIG. 4. Selection of the View Month option results in the display of the monthly schedule for the month including the day displayed in FIG. 4. Selection of the Close option closes the Calendar application.

Figure 6:
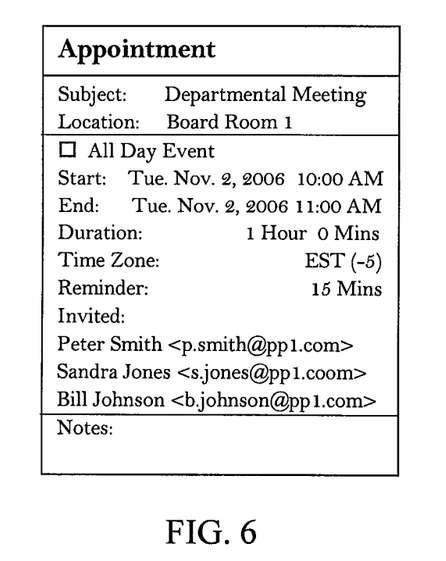

As indicated above, selection of the Open option from the submenu displayed in FIG. 5 results in the display of details of the selected event in the calendar user interface displayed on the LCD display 24. For example, selection of the "Departmental Meeting" shown in FIG. 4, followed by selection of the Open option shown in FIG. 5 results in the display of details of the meeting as shown in FIG. 6. These details include the meeting subject, the location, an indication as to whether or not the meeting is an all-day event, the start time, the end time, the duration, the time zone, a reminder setting, a list of invitees and notes relating to the meeting. For the exemplary meeting shown in FIG. 5, the subject is "Departmental Meeting" and the location is "Board Room 1". The start time of the meeting is Wednesday, Jul. 26, 2006 at 10:00 a.m. and the end time is Wednesday, Jul. 26, 2006 at 11:00 a.m. Thus, the meeting duration is 1 hour. A reminder is set to remind the user of the electronic device 20 of the meeting 15 minutes prior to the meeting. It will be appreciated that the reminder is a notification that depends on the enabled profile settings referred to above. The invitees include Peter Smith, Sandra Jones and Bill Johnson. As shown, email address information is included for each invitee.

Figure 7:
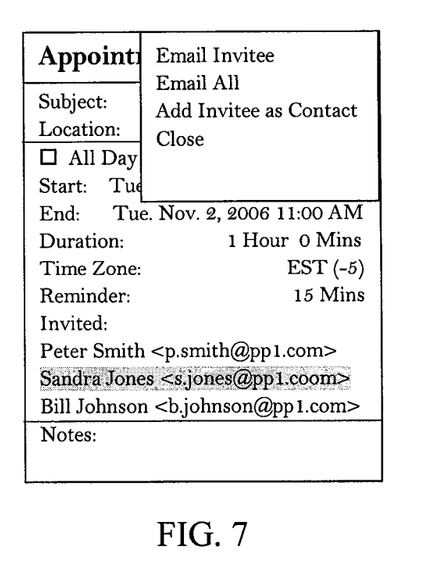
Figure 8:
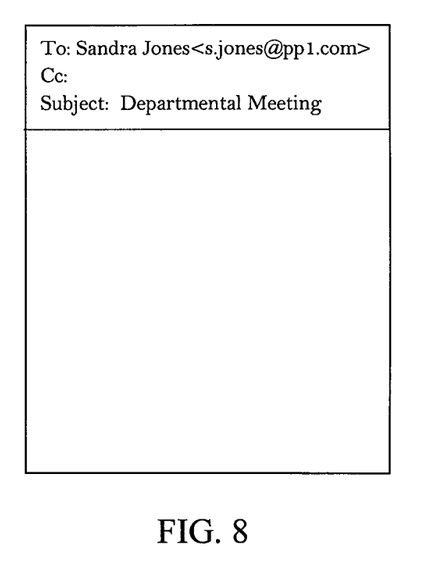

The invitees are selectable by scrolling down through the displayed details of the meeting in the calendar user interface using the trackwheel 30 to highlight the desired name, and then pressing inwardly on the trackwheel 30 in the direction of arrow A, as described above with reference to FIG. 1. Upon selection of one of the invitees, a submenu is displayed on the LCD display 24, displaying different options for selection, including, for example, Email Invitee, Email All, either Add Invitee as Contact, or View Contact, and Close, as shown in FIG. 7. Selection of the Email Invitee option acts as an email command received at the processor 36. In response to the selection of the Email Invitee option, the Messages application is executed and an email composition interface is displayed on the LCD display 24, as shown in FIG. 8. The email composition interface includes user-editable portions of fields including a user-editable portion of a "To" address field, a user-editable portion of a "Cc" address field, a user-editable portion of a "Subject" field and a message field. The user-editable portion of the "To" address field is automatically populated with the email address of the invitee selected. Similarly, the user-editable portion of the "Subject" field is automatically populated with the meeting subject shown in the meeting subject line of FIG. 6. The "Cc" address field is not automatically populated but can be populated by user entry of an email address in the field using the key pad 34 or by selection of an address from the contacts in the Address Book. The message field is populated by user entry of a message using the key pad 34. Upon completion of the email message, the email message is sent to the selected meeting invitee by pressing the trackwheel 30 in the direction of arrow A, resulting in the display of an email submenu, followed by user selection of a Send option from the email submenu.

Figure 9:
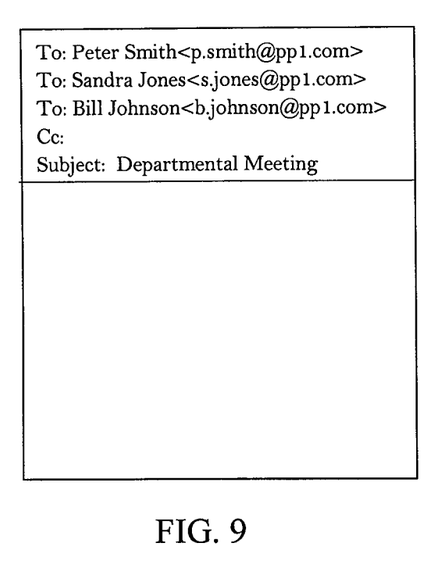

Selection of the Email All option acts as an email command received at the processor 36. In response to the selection of the Email All option, the Messages application is executed and an email composition interface is displayed on the LCD display 24, as shown in FIG. 9. As described above, the email composition interface includes user-editable portions of fields. With the selection of the Email All option, however, the user-editable portion of the "To" address field is automatically populated with the email addresses of each of the invitees to the meeting. Similarly, the user-editable portion of the "Subject" field is automatically populated with the meeting subject shown in the meeting subject line of FIG. 6. Again, the "Cc" address field is not automatically populated but can be populated by user entry of an email address in the field or by selection of an address from the contacts in the Address Book. Similarly, the message field is populated by user entry of a message. The email message is sent to all of the invitees by user selection of the Send option in the email submenu.

Figure 10:
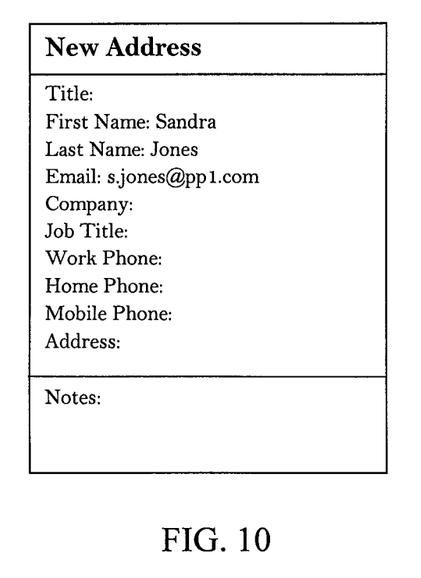

The Add Invitee as "Contact" option is provided if the contact information is not already present in the Address Book of the electronic device 20. The processor 36 conducts a comparison of the contact information for the selected invitee with the contact information for contacts in the Address Book of the electronic device 20. If the contact information for the selected invitee is not present in the Address Book of the electronic device 20, the Add Invitee as "Contact" option is displayed in the submenu of FIG. 7. Selection of the Add Invitee as "Contact" option causes execution of the Address Book application and a new contact composition interface is displayed on the LCD display 24, as shown in FIG. 10. The new contact composition interface includes user-editable portions of fields including, for example, a "Title" field, a "First Name" field, a "Last Name" field, an "Email Address" field, a "Company" field, several phone fields, an "Address" field, and a "Notes" field. Other user-editable fields are possible. The user-editable portion of the "Email Address" field is automatically populated with the email address of the invitee selected. Similarly, the "First Name" field and "Last Name" field are automatically populated with the first name and last name of the invitee based on information included with the email address. Any or all of the remaining fields can be populated by user entry of information into any or all of the fields. Upon completion of entry of information into the fields, the new contact is saved in the Address Book of the electronic device 20 by selection of a Save option from an Address Book submenu, as will be appreciated by those skilled in the art.

The "View Contact" option (not shown) is provided if the contact information is already present in the Address Book of the electronic device 20. As described above, the processor 36 conducts a comparison of the contact information of the selected invitee with the contact information in the Address Book of the electronic device 20. If the contact information is already present in the address book of the electronic device 20, the "View Contact" option is displayed in the submenu of FIG. 7, rather than the "Add Invitee as Contact" option shown. Selection of the "View Contact" option causes execution of the Address Book application and display of the contact information for the invitee in a contact interface displayed on the LCD display 24. Any or all user-editable fields of the contact interface can be populated or amended and the contact can be saved again in the Address Book to save the new or amended information. Alternatively, the contact interface can simply be closed after viewing by selection of a "Close" option in an Address Book submenu.

Selection of the "Close" option results in the closing of the Calendar application, returning to the menu screen of FIG. 3.

Figure 11:
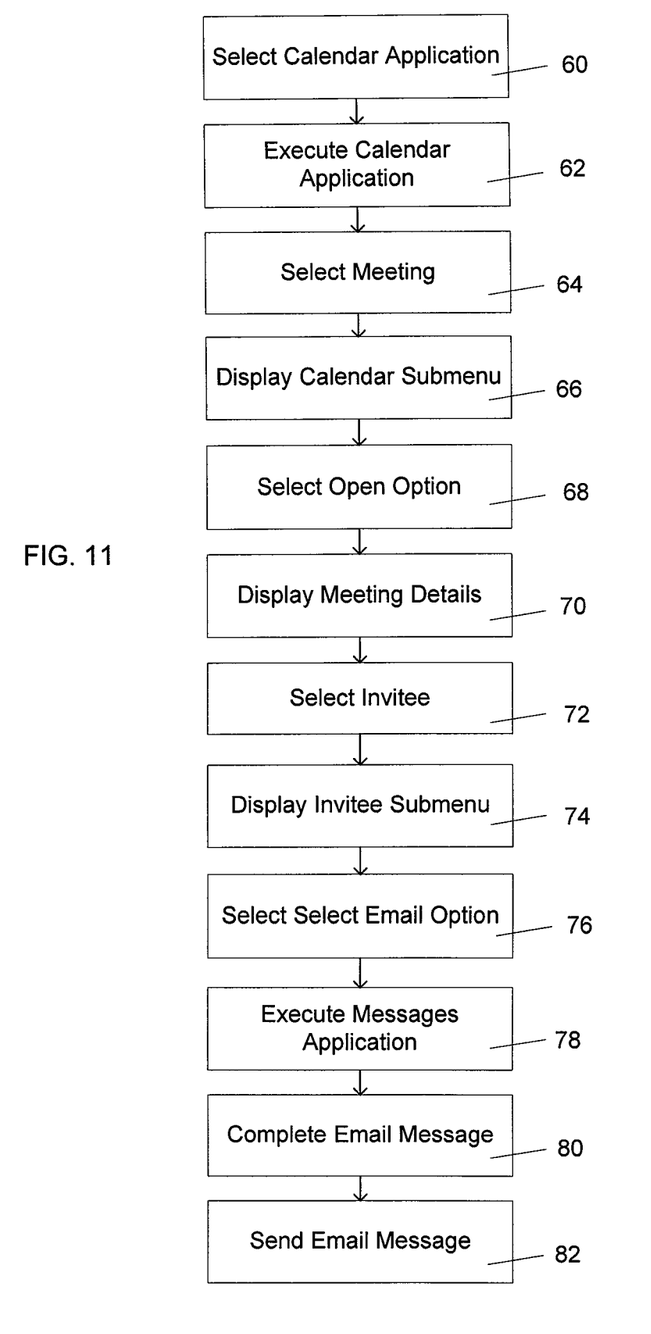
FIG. 11 is a flowchart depicting a method of messaging meeting invitees in accordance with one embodiment.
Figure 12:
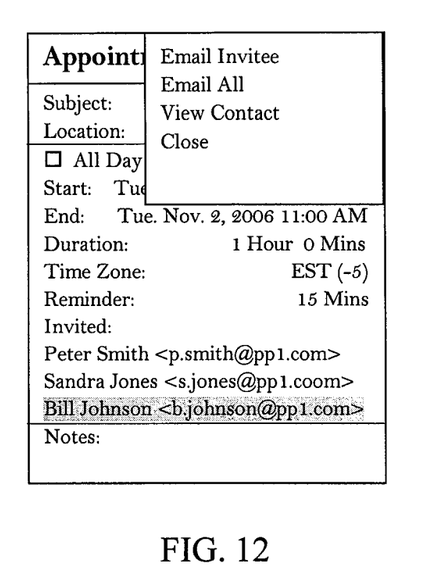
FIG. 12 is another exemplary screen of the LCD display of the electronic device of FIG. 1.

A method of composing an email message will now be described with reference to the foregoing discussion of the electronic device 20. Referring to FIG. 11, a flowchart showing a method of composing an email message at the electronic device 20 is shown. The flowchart illustrates steps that include user input as well as software execution within the processor 36. The coding of such software is well within the scope of a person of ordinary skill in the art. Starting from the menu screen shown in FIG. 3, the Calendar application is selected on the LCD display 24 (step 60). Upon selection of the Calendar application from the menu screen, the processor 36 executes the Calendar application and a calendar user interface is displayed including information relating to calendared events (step 62). For exemplary purposes, the display screen of FIG. 4 is referred to, in which two calendared events are shown in a daily schedule format.

It will be appreciated that the "Departmental Meeting" in the Calendar application shown in FIG. 4 has been previously added as a calendared event by, for example, user acceptance of an invitation to a meeting. The user receives an invitation to a meeting by email. Upon opening the email, the meeting details including the subject, the date, the time, the location and the names of the other invitees, are displayed. To accept or decline a meeting invitation, the user then presses inwardly on the trackwheel 30 along the path of the arrow A. The user of the electronic device 20 is then provided with options including Accept, Accept with Comments, Decline, and Decline with Comments. Selection of either the Accept or the Accept with Comments options results in automatic entry of the meeting as a calendared event in the Calendar application, at the date and time indicated in the meeting information. When either the Decline or Decline with comments options are selected, the meeting is not entered as a calendared event in the Calendar application.

Alternatively, the "Departmental Meeting" in the Calendar application shown in FIG. 4 has been previously added as a calendared event by user composition and sending of an invitation. In this case, the user selects a Create New Appointment option from a submenu in the Calendar application. A new-meeting user interface is provided via the LCD display 24, and the user enters information including, for example, the subject, the date, the time, the location of the meeting and information relating the invitees, in the appropriate user-editable fields. It will be appreciated that the information relating to the invitees can be selected from a list from the Address Book application or entered by typing the email information into the key pad 34. The meeting is then saved by pressing the trackwheel 30 along the path of the arrow A to display a submenu followed by selection of a Save Meeting option from the submenu.

Next, the "Departmental Meeting" is selected (step 64) giving rise to the submenu which provides the options of Go To Date, Prev Day, Next Day, Prev Week, Next Week, New, Open, Delete, View Week, View Month, and Close on the LCD display as described above with reference to FIG. 5 (step 66). The Open option is then selected (step 68), which results in the display of details of the selected meeting as shown in FIG. 6 (step 70). As described hereinabove, the names and email addresses for each of the invitees are shown in the displayed details of the selected meeting, as shown in FIG. 6. In the present exemplary embodiment, the invitees include Peter Smith, Sandra Jones and Bill Johnson. The invitee, Sandra Jones, is then selected (step 72) giving rise to the display of the options "Email Invitee, Email All, and Add Invitee as Contact, in an invitee submenu as shown in FIG. 7 (step 74). In the present exemplary embodiment, contact information for the selected invitee, Sandra Jones, is not already present as a contact in the Address Book application and thus, the option to Add Invitee as Contact is provided. The Email Invitee option is selected (step 76) causing execution of the Messages application (step 78) and an email composition interface is displayed on the LCD display as shown in FIG. 8. The user-editable portion of the "To" field is automatically populated with the email address of the selected invitee, Sandra Jones, and the user-editable portion of the "Subject" field is automatically populated with the meeting subject from the details of the meeting displayed in FIG. 6. The email message is then completed (step 80) by user entry of the message in the message field and, optionally, user entry of additional email addresses in the "To" or "Cc" address fields. When completed, the email is sent to the selected invitee, Sandra Jones, as well as any other addressees added by the user in the previous step by selection of a Send option from an email submenu (step 82).

In the above-described exemplary embodiments, the user-editable portion of the "Subject" field is automatically filled in with the "Subject" field of the meeting. It will be appreciated that it is possible that this field is left blank for the user to fill in with an appropriate title. Also, the user-editable fields that are automatically filled in can be selectable for editing by the user as desired. For example, after selecting the "Email All" option, the user can remove one of the recipients from the user-editable portion of the "To:" field while leaving the remainder, if desired.

According to one aspect of an embodiment there is provided a method of composing an email message at an electronic device having a calendar application and email capability. The method includes receiving an email command from a user input of the electronic device through a calendar user interface, the email command relating to at least one of a plurality of intended attendees of a calendared meeting, and providing an email composition interface in response to receiving the email command. The email composition interface includes a user-editable portion of an address field. The user-editable portion of the address field is automatically populated with email address information for the at least one of the plurality of intended attendees.

According to another aspect of an embodiment there is provided a computer program product for composing an email message. The computer program product includes a computer-readable medium having computer-readable code embodied therein for implementing the above method in an electronic device.

According to yet another aspect of an embodiment there is provided an electronic device having a calendar application and email capability. The electronic device includes a display, a user input and a processor. The processor is connected to the display and the input, and is operable to receive an email command from the user input in a calendar user interface, the email command relating to at least one of a plurality of intended attendees of a calendared meeting. The processor is further operable to provide an email composition interface in response to receiving the email command, the email composition interface including a user-editable portion of an address field. The user-editable portion of the address field is automatically populated with email address information for the at least one of the plurality of intended attendees.

Therefore, the user of the electronic device can create an email message to one or more invitees or attendees of a meeting by selection of an email option when viewing a meeting in the calendar application. The email address of the selected invitee(s) or attendee(s) is automatically inserted in the appropriate portion of the email address field. Similarly, the user of the electronic device can create an email message to all invitees or attendees of a meeting by selection of an email-all option when viewing a meeting in the calendar application. Again, the email addresses of the invitees or attendees are automatically inserted in the appropriate portion of the email address field.

While the embodiments described herein are directed to particular implementations of the electronic device and method of composing an email message, it will be understood that modifications and variations to these embodiments are within the scope and sphere of the present application. For example, many of the options provided in the submenus and the displayed details in the screens shown in the Figures are provided for exemplary purposes and such options and details can vary.

Many other modifications and variations may occur to those skilled in the art. All such modifications and variations are believed to be within the sphere and scope of the present application.

The invention claimed is:

1. A method comprising:
   at a device comprising: a processor, an input device and a display, upon an invitee associated with an existing event being selected using the input device, rendering, at the display, messaging commands including: a first command specific to the invitee, and a second command;
   upon one of the first command or the second command selected using the input device, rendering, at the display, a message composition interface that includes an editable portion of an address field, and excludes the existing event;
   based upon the first command being selected, automatically populating, using the processor, the editable portion with a messaging address for the invitee; and, based upon the second command being selected, automatically populating, using the processor, the editable portion with both the messaging address and another messaging address.

2. The method of claim 1, wherein selection of the invitee occurs in a calendar interface comprising a selectable indication for composing a message to the invitee associated with the existing event.

3. The method of claim 1, wherein the existing event is associated with a meeting invitation received at the processor prior to the invitee being selected, the existing event including a date, a time and the messaging address.

4. The method of claim 1, further comprising:
receiving, at the processor, a meeting invitation for the existing event, that includes the messaging address; and, in response,
saving the existing event at a memory associated with the device.

5. The method of claim 1, further comprising:
transmitting, using the processor, from the device to the messaging address, a meeting invitation that includes the messaging address; and, in response,
saving the existing event at a memory associated with the device.

6. The method of claim 1, further comprising, upon one of the first command or the second command being selected, automatically populating a subject field of the message composition interface with data identifying the existing event.

7. The method of claim 1, wherein the first command and the second command are rendered at a calendar interface that occupies only a portion of the display.

8. The method of claim 1, wherein the first command and the second command are rendered in a menu of a calendar interface.

9. The method of claim 1, wherein the device further comprises one or more of a handheld device, a portable handheld device and a mobile handheld device.

10. A device comprising:
a processor, an input device and a display, the processor configured to:
upon an invitee associated with an existing event being selected using the input device, render, at the display, messaging commands including: a first command specific to the invitee, and a second command;
upon one of the first command or the second command being selected using the input device, render, at the display, a message composition interface that:
includes an editable portion of an address field; and
excludes the existing event;
based upon the first command being selected, automatically populate, using the processor, the editable portion with a messaging address for the invitee; and,
based upon the second command being selected, automatically populate, using the processor, the editable portion with both the messaging address and another messaging address.

11. The device of claim 10, wherein selection of the invitee occurs in a calendar interface comprising a selectable indication for composing a message to the invitee associated with the existing event.

12. The device of claim 10, wherein the existing event is associated with a meeting invitation received at the processor prior to the invitee being selected; the existing event including a date, a time and the messaging address.

13. The device of claim 10, wherein the processor is further configured to:
receive a meeting invitation for the existing event, that includes the messaging address; and; in response,
save the existing event at a memory associated with the device.

14. The device of claim 10, wherein the processor is further configured to:
transmit from the device to the messaging address, a meeting invitation that includes the messaging address; and; in response,
save the existing event at a memory associated with the device.

15. The device of claim 10, wherein the processor is further configured to: upon one of the first command or the second command being selected, automatically populate a subject field of the message composition interface with data identifying the existing event.

16. The device of claim 10, wherein the first command and the second command are rendered at a calendar interface that occupies only a portion of the display.

17. The device of claim 10, wherein the first command and the second command are rendered in a menu of a calendar interface.

18. The device of claim 10, further comprising one or more of a handheld device, a portable handheld device and a mobile handheld device.

19. A non-transitory computer-readable medium storing a computer program executable by a processor of a device having an input device and a display, wherein execution of the computer program is to:
upon an invitee associated with an existing event being selected using the input device, render, at the display, messaging commands including: a first command to the invitee, and a second command;
upon one of the first command or the second command being selected using the input device, render, at the display, a message composition interface that:
includes an editable portion of an address field; and
excludes the existing event;
based upon the first command being selected, automatically populate the editable portion with a messaging address for the invitee; and,
based upon the second command being selected, automatically populate the editable portion with both the messaging address and another messaging address.

20. The non-transitory computer-readable medium of claim 19, wherein selection of the invitee occurs in a calendar interface comprising a selectable indication for composing a message to the invitee associated with the existing event.

* * * * *

UNITED STATES PATENT AND TRADEMARK OFFICE
CERTIFICATE OF CORRECTION

PATENT NO. : 11,157,141 B2  
APPLICATION NO. : 16/050402  
DATED : October 26, 2021  
INVENTOR(S) : May et al.

Page 1 of 1

It is certified that error appears in the above-identified patent and that said Letters Patent is hereby corrected as shown below:

In the Claims

In Column 8, Line 61, In Claim 1, before "selected" insert -- being --.

In Column 10, Line 7, In Claim 12, delete "selected;" and insert -- selected, --, therefor.

In Column 10, Line 11 (Approx.), In Claim 13, delete "and;" and insert -- and, --, therefor.

In Column 10, Line 18, In Claim 14, delete "and;" and insert -- and, --, therefor.

In Column 10, Line 41, In Claim 19, after "command" insert -- specific --.

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*